United States Patent [19]

Hains

[11] Patent Number: 5,022,742

[45] Date of Patent: Jun. 11, 1991

[54] FAST SHUTTER FOR PROTECTION FROM ELECTROMAGNETIC RADIATION

[75] Inventor: Franklin D. Hains, Falls Church, Va.

[73] Assignee: The United States of America as represented by the Secretary of the Navy, Washington, D.C.

[21] Appl. No.: 538,617

[22] Filed: Oct. 3, 1983

[51] Int. Cl.$^5$ .............................................. G02F 1/01
[52] U.S. Cl. ...................................... 350/355; 350/393
[58] Field of Search ................................ 350/355-356, 350/363, 388, 390, 393, 377; 333/17 L, 211, 12, 17 R, 81 A, 81 B; 357/2; 361/118-119; 372/103

[56] References Cited

U.S. PATENT DOCUMENTS

| | | | |
|---|---|---|---|
| 1,632,069 | 6/1927 | Hartley | 350/393 |
| 3,245,315 | 4/1966 | Marks et al. | 350/388 |
| 3,266,370 | 8/1966 | Marks et al. | 350/276 R |
| 3,271,578 | 9/1966 | Bockemuehl | 250/213 |
| 3,305,863 | 2/1967 | Jacobs | 350/355 |
| 3,475,609 | 10/1969 | Schneider . | |
| 3,656,836 | 4/1972 | De Cremoux . | |
| 3,695,747 | 10/1972 | Maldonado | 350/392 |
| 3,902,061 | 8/1975 | Harris | 250/213 A |
| 3,980,397 | 9/1976 | Judd et al. | 372/103 |

FOREIGN PATENT DOCUMENTS

| | | | |
|---|---|---|---|
| 73748 | 6/1977 | Japan | 350/393 |
| 11246 | 1/1980 | Japan | 350/355 |
| 2089173 | 6/1982 | United Kingdom | 361/119 |

OTHER PUBLICATIONS

Smith et al, "Aspects of Threshold Switching", Electrocomponent Science & Technology, 12-1974, pp. 137-139.
Chang et al, "Amorphous Semiconductor Light Modulator" IBM Tech. Disc. Bull., 5-1970, pp. 2236.
Kienzle et al, "Optical Properties of Tl$_2$SeAs$_2$Te$_3$ Amorphous Chalcogenide Glass in the Range 2 to 10.6 $\mu$m," JOSA vol. 6, 1978, pp. 1396.
Kolomiets et al, "Changes in the Optical Properties of Amorphous (As$_2$Se$_3$)$_{1-x}$(As$_2$Te$_3$)$_x$ Films under the Action of Electric Fields & Optical Excitation", Sov. Phys. Semicond. 8-1978, pp. 938-940.

Primary Examiner—Eugene R. LaRoche
Attorney, Agent, or Firm—Kenneth E. Walden

[57] ABSTRACT

A solid state shutter for blocking EMP is disclosed. The shutter includes thin films of amorphous semiconductor material fro the Group V or VI elements deposited on a silicon dioxide substrate. An antenna senses incident EMP causing a trigger circuit to apply a voltage across the thin films. The thin films switch from a state of high resistance to a state of low resistance for blocking passage of the EMP.

25 Claims, 1 Drawing Sheet

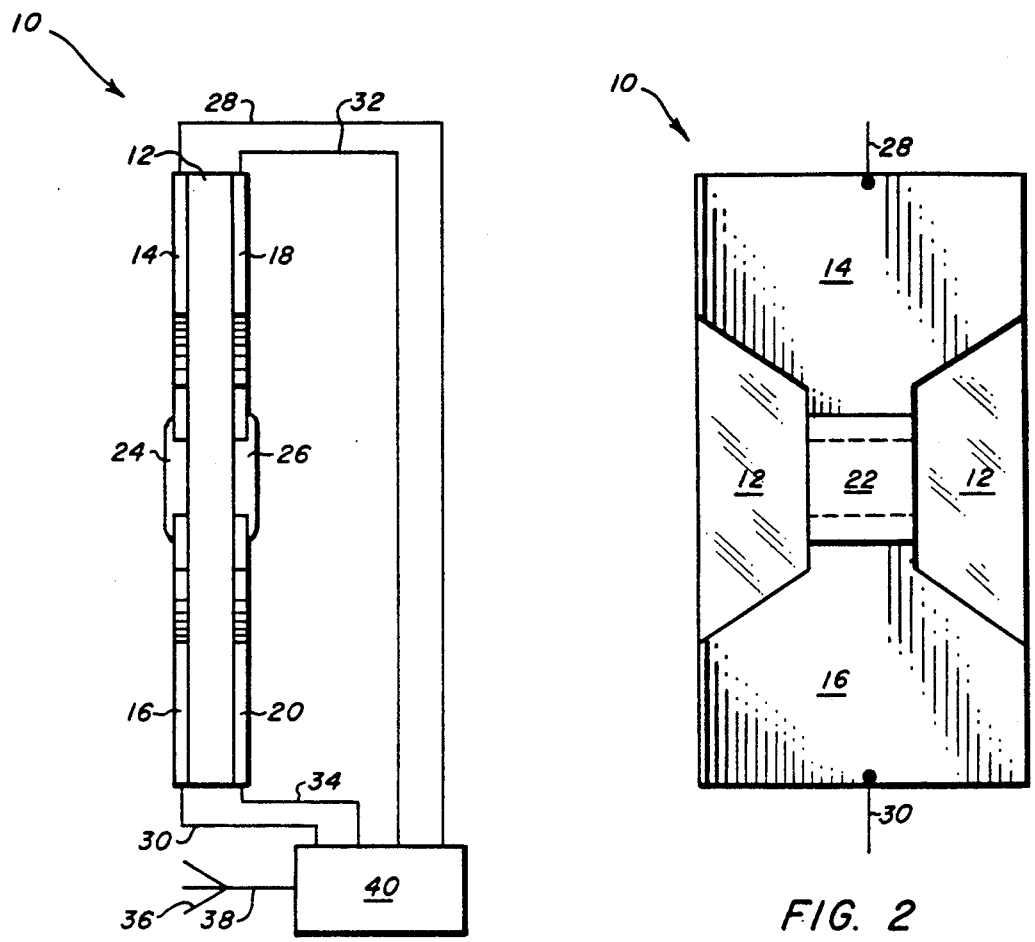
FIG. 1
FIG. 2
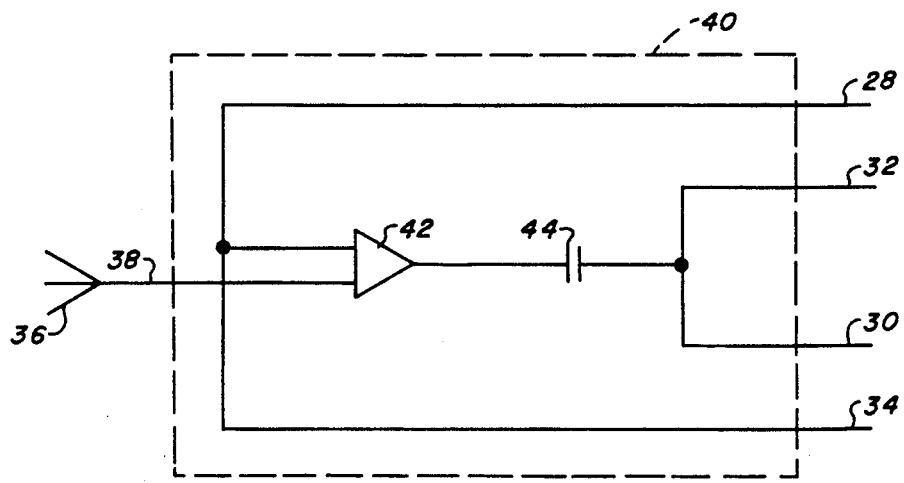
FIG. 3

FAST SHUTTER FOR PROTECTION FROM ELECTROMAGNETIC RADIATION

BACKGROUND OF THE INVENTION

This invention relates to modulation of electromagnetic energy and more particularly to a device for modulating incident electromagnetic energy known as electromagnetic pulse (EMP). In still gretare particularity the invention relates to a shutter device for selectively blocking the passage of EMP upon detection thereof while allowing electromagnetic waves having frequencies gretare than the EMP to pass through the shutter.

Protection against that range of electromagnetic waves known as microwave and radiowave is highly desirable. Even more desirable is protection against that range of energy known as EMP. EMP is electromagnetic wave energy associated with nuclear detonation and is normally of large amplitude falling in a frequency range of 0.1 MHz to 10 MHz. If left unprotected, electronic equipment can be adversely affected if exposed to EMP. Consequently, there is a need for the shielding of such equipment. However, because some electronic equipment is used to detect or operate in response to electromagnetic waves of selective frequencies or ranges other than EMP, any shielding device must preferably be transparent to these harmful frequencies of interest. Heretofore, shields that block EMP have not had the desired transparency over broad unharmful frequencies ranges of interest.

The shutter described herein takes advantage of the properties common to those materials known as chalcogenide alloy glasses which are made from the Group V or VI elements. The general system consists of Te-As-Ge-Si. While not to be considered limited thereto, one specific alloy of this general system which lends itself to the structure disclosed hereinbelow is $Te_{40}As_{35}Ge_7Si_{18}$. These alloys are known as amorphous semiconductors exhibiting which is commonly called "memory switch," meaning that when in an amorphous state, they exhibit high resistance and act as a resistor, and when in a microcrystalline state, they exhibit low resistance and act as a metal. The literature has reported this property and their ability to switch rapidly from a resistor to a metal.

SUMMARY OF THE INVENTION

Accordingly, it is a primary objective of the invention to provide for a device that blocks EMP.

Another primary objective of the invention is to provide for a device that protects electronic equipment and personnel from harmful EMP.

Another object of the invention is to provide for a device that blocks EMP and allows passage of other electromagnetic wave frequencies.

A further object of the invention is to provide for a device that is normally transparent to all electromagnetic wave frequencies and switches to selectively prevent passage of a sensed EMP.

And, a still further object of the invention is to provide for a device that reverts to a transparent state upon the termination of the EMP.

The objects are achieved by providing for a high speed solid state electronic switch that functions as a shutter for blocking the passage of EMP in response to detection thereto by an antenna. The shutter includes thin films of amorphous semiconductor chalcogenide alloy glass from the Group V or VI elements deposited on opposite surfaces of a silicon dioxide insulator. Electrodes are arranged on the insulator surfaces in electrical contact with the thin film surfaces and define an aperture for passing incident electromagnetic waves through the amorphous semiconductor material. An antenna tuned to detect incoming EMP is coupled to a trigger circuit which amplifies the antenna signal and discharges a capacitor across the semiconductor material. The applied voltage causes the material to switch from a state of high resistance to a state of low resistance. The material exhibits properties of a metal and opacity to the incident EMP while remaining substantially transparent to frequencies greater than that of the EMP. Removal of the applied voltage within a predetermined time frame causes the material to revert to its state of high resistance and transparency to all frequencies.

BRIEF DESCRIPTION OF THE DRAWINGS

FIG. 1 is side elevation of the preferred embodiment showing details of construction.

FIG. 2 is a front elevation of the preferred embodiment showing details of construction.

FIG. 3 is a schematic of an antenna and trigger circuit for use with the preferred embodiment of FIGS. 1 and 2.

DETAILED DESCRIPTION OF THE PREFERRED EMBODIMENT

Shown in FIGS. 1 and 2 is a shutter 10 including a substrate 12 of preferably silicon dioxide onto which thin film alloys 24, 26 of amorphous semiconductor material are deposited by normal sputtering techniques. As heretofore set out the thin film amorphous semiconductor material is a chalcogenide alloy glass chosen from the general system consisting of the Group V or VI elements Te, As, Ge, Si. For the preferred embodiment disclosed herein, it is contemplated that the alloy $Te_{40}As_{35}Ge_7Si_{18}$ is acceptable. Also substrate 12 is not to be considered limited to silicon dioxide but rather any insulative material that is transparent to the unharmful electromagnetic waves of interest may be used. Also deposited onto the opposing surfaces of substrate 12 are four electrodes 14, 16, 18, 20. First electrode pair 14, 16 are deposited on one surface of substrate 12 so as to be in electrical contact with first thin film 24. Likewise, second electrode pair 18, 20 is deposited on the opposite surface of substrate 12 so as to be in electrical contact with second thin film 26. In the embodiments shown, thin films 24, 26 are shown deposited overlapping the respective electrodes to create the required electrical continuity. Electrodes 14, 16, 18, 20 can be made of carbon or a metal that will not alloy with thin films 24, 26. An acceptable electrode material is platinum. Electrodes 14, 16, 18, 20, define a square or rectangular aperture 22, see FIG. 2, for passing incident electromagnetic waves through the thin films. The aperture width as measured between the electrode pairs should be kept to a minimum, and in any case should not be less than the wavelength of the normal signal of interest. Typically, the aperture width would be from 1 to 100 microns. More specifically, assuming the signal of interest to be allowed to pass through the shutter is in the visible range, the gap should be not less than the wavelength of the visible signal. For aperture widths falling in the 1 to 100 micron range, signals of interest are restricted to those having wavelengths less than $10^{-4}$ meters. The thickness of thin films 24, 26 typically fall in the range of 1 to 100 microns and is dependent on the expected intensity of the EMP to be encountered.

The film thickness is adjusted typically within the 1 to 100 micron range to assure prevention of passage of the EMP with thicker films offering greater blocking capabilities.

As shown in FIG. 1, there is an electromagnetic wave sensor in the form of an antenna 36 tuned to detect and generate a signal in response to EMP. Antenna 36 is located in close proximity to the line of sight through aperture 22 so as to detect the EMP incident on the shutter. Antenna 36 is coupled to a shutter trigger circuit 40 via a cable 38. Likewise, the outputs of trigger circuit 40 are coupled to electrode pairs 14, 16 and 18, 20 via cables 28, 30 and 32, 34 respectfully. It is to be understood that the trigger circuit outputs are connected to the respective electrode pairs such that the current flow through first electrode pair 14, 16, and thin film 24 is in opposite direction to the current flow through second electrode pair 18, 20 and thin film 26. The oppositely directed current flows are necessary so that the magnetic fields developed cancel each other. Also, all cables such as leads 28, 30, 32, 34 and antenna cable 38 should be kept as short and symmetric as possible.

Trigger circuit 40 is designed to be inoperative at the amplitude levels of the signals of interest to allow their unimpeded passage through the shutter. Trigger circuit 40 becomes operative when the foot of an EMP is detected. The foot of an EMP is that portion of the EMP wave defined by the time interval required for the amplitude of the wave to rise to a predetermined intersity level. When the amplitude of the EMP reaches the operational level of the trigger circuit, the EMP signal is amplified by amplifier 42 and a capacitor 44 is caused to discharge across the respective electrode pairs, thereby applying a voltage across the thin film semiconductor materials.

As set out above, the amorphous semiconductor materials used in this invention normally exhibit high resistance. However, when sufficient voltage, due to the discharge of capacitor 44, is applied across the material, it exhibits a low resistance and assumes properties of a metal effectively blocking passage of the EMP. All of the amorphous semiconductor materials for use herein have a threshold voltage at which they switch to the low resistance state. Normally a threshold voltage on the order of $10^5$ v/cm is enough to cause the material to switch to the low resistance, EMP blocking, state. Typically, there is a time delay of approximately $10^{-6}$ sec., between the application of the threshold voltage across the film material and the instant the material begins to switch to the state of low resistance. After the initial time delay, it typically takes only $10^{-10}$ sec. for the material to complete the transition to the low resistance state and become opaque to the EMP.

It can be seen that the delay period of $10^{-6}$ sec, is relatively long, and, as set out below, may be sufficiently long, to allow appreciable EMP to pass through the shutter before it can switch to the blocking state. This delay period can be significantly reduced by increasing the applied voltage across the material to a level above the threshold voltage of the material. For example, increasing the applied voltage to about 100% of the threshold voltage reduces the delay period to about $10^{-9}$ sec. The time delay period decreases exponentially after the applied voltage exceeds the threshold voltage by about 20%. Increasing the applied voltage does not effect the time period required for the material to completely switch to the low resistance state once it begins the transition. As stated, this time period is relatively fast and on the order of $10^{-10}$ sec.

Additionally, the shutter will automatically revert back to the high resistance state if the applied voltage is removed within approximately $10^{-3}$ sec. after the material begins to switch. If the applied voltage is not removed within this $10^{-3}$ sec. period, the film becomes set in the low resistance state even if the applied voltage is later removed. Therefore, if the shutter is required to remain closed for a period longer than $10^{-3}$ sec., for example, when an EMP of long duration is sensed, a reset pulse of about 120 mA current of 5 microseconds duration must be applied to the films to cause them to revert back to their high resistance transparent state. Circuits for accomplishing this are readily designed by those skilled in the art having the benefit of the above disclosed requirements.

As stated, the trigger circuit must detect the foot of the EMP in order to trigger the switching of the films to the low resistance state. If the wavelength of incident EMP is sufficiently short, the foot of the EMP wave may be less than the switching time of the shutter, thereby allowing the higher intensity level portions of the EMP wave to pass through the shutter before the films can switch to the opaque state. If the switching time of the shutter is too slow, and/or the foot of the EMP wave too short, the intensity level of the EMP wave thereby allowed to pass through the shutter may exceed acceptable limits.

Therefore, the shutter must be constructed to switch as fast as possible. Factors such as minimum cable lengths, minimum circuit path lengths, fast operating circuit components, and applied voltages above the threshold level of the amorphous semiconductor thin films are required to minimize the switching delay period.

Further, it is thought that the foot of the EMP will be of an acceptable magnitude to allow sufficient time for the trigger circuit to switch the shutter without allowing the higher intensity portions of the wave to pass therethrough when the EMP has a wavelength greater than 200M. For wavelengths less than 200M the rate of the rise in amplitude of the EMP wave is sufficiently fast so as to allow the intensity of the EMP to rise to unacceptable levels prior to the circuitry and film responding to switch to the opaque state.

While the embodiment described operates for EMP wavelengths greater than 200M, it is contemplated that those skilled in the art having the benefit of the teachings herein can readily modify and adapt the invention to switch sufficiently fast to prevent the passage of EMP of shorter wavelengths, therefore this invention is not to be considered to be limited to wavelengths greater than 200M and said modifications are to be within the scope of the appended claims.

I claim:

1. A device for modulating electromagnetic radiation comprising:

a substrate of a material transparent to substantially all electromagnetic wave frequencies;

a first thin film of an amorphous semiconductor chalogenide alloy glass deposited on one surface of said substrate;

a second thin film of an amorphous semiconductor chalogenide alloy glass material deposited on the opposite surface of said substrate, and;

means for applying a first predetermined voltage across said first film and applying a second predetermined voltage across said second film in response to electromagnetic radiation having a frequency greater than a predetermined value and incident on either of said thin films such that current flow through said first film is in a direction opposite to the current flow through said second film.

2. The device as defined in claim 1 wherein the substrate is silicon dioxide.

3. The device as defined in claim 1 wherein said first and second thin films are alloys made from the system consisting of the elements Te-As-Ge-Si.

4. The device as defined in claim 1 wherein said thin films are $Te_{40}As_{35}Ge_7Si_{18}$.

5. The device as defined in claim 3 wherein the thickness of the thin films is at least 1 micron.

6. The device as defined in claim 1 wherein said means for applying the predetermined voltage comprises:
an antenna tuned to generate an output signal in response to the incident electromagnetic radiation having a frequency greater than the predetermined value, and;
a trigger circuit having an input coupled to the antenna output signal adapted to generate an output switching voltage in response to antenna signals representing electromagnetic radiation frequencies above the predetermined value, said trigger circuit output coupled to each of said first and second thin films for applying the output switching voltage across said films.

7. A shutter for preventing the passage of EMP comprising:
a substrate having opposed surfaces of a material that is substantially transparent to all electromagnetic wave frequencies;
a first thin film of an amorphous semiconductor chalogenide alloy glass being normally transparent to all electromagnetic frequencies deposited on one of the substrate surfaces;
a second thin film of the amorphous semiconductor chalogenide alloy glass deposited on the opposing surface of said substrate, said thin films adapted to become opaque to incident electromagnetic waves having frequencies above a predetermined value upon application of a switching voltage of at least a predetermined threshold level across each of said thin films, and;
means for applying the switching voltage across each of said thin films in response to the predetermined incident electromagnetic waves said switching voltage in said first and second films being such that current flow in said first film in opposite to said current flow in said second film.

8. The shutter as defined in claim 7 wherein the substrate is silicon dioxide.

9. The shutter as defined in claim 7 wherein said first and second thin films are alloys made from the system consisting of the elements Te-As-Ge-Si.

10. The shutter as defined in claim 7 wherein the thin films are $Te_{40}As_{35}Ge_7Si_{18}$.

11. The shutter as defined in claim 9 wherein the thickness of said first and second thin films is at least 1 micron.

12. The shutter as defined in claim 7 wherein said means for applying the switching voltage comprises:

an antenna tuned to generate an output signal in response to the predetermined incident electromagnetic wave, and;
a trigger circuit having an input coupled to the antenna output signal adapted to generate the output switching voltage in response to the antenna signal, said trigger circuit output coupled to each of said first and second thin films for applying the output switching voltage across said films.

13. A solid state shutter for modulating electromagnetic waves in response to EMP comprising:
a substrate of an electrically insulating electromagnetic wave transparent material having at least two opposed, flat surfaces;
a first thin film of an amorphous semiconductor chalogenide alloy glass chosen from the system consisting of the elements Te-As-Ge-Si deposited on a portion of one of the substrate surfaces;
a second thin film of an amorphous semiconductor chalogenide alloy glass deposited on a portion of the opposing substrate surface opposite said first thin film, said thin films being transparent to electromagnetic waves when in a normal non-crystalline state and adapted to become opaque to electromagnetic waves upon application of a switching voltage across each of said films of a magnitude equal to at least a predetermined threshold level;
a first pair of electrodes deposited on the substrate in electrical contact with said first thin film and spaced apart across said first film so as to define an aperture having a width for passing electromagnetic waves having wavelengths greater than a predetermined value;
a second pair of electrodes deposited on the opposing substrate surface in electrical contact with said second thin film and spaced apart across said second film an amount equal to the spacing of said first electrode pair, thereby also defining an aperture for passing the predetermined electromagnetic radiation through the shutter;
means for detecting EMP incident on the shutter, and;
means for having an input coupled to the means for detecting EMP and an output coupled to said electrode pairs for applying the switching voltage across each thin film in response to the EMP detected, with the switching voltage being applied to said first and second films being such that current flow in said first film is opposite to current flow in said second film.

14. The shutter as defined in claim 13 wherein the substrate is silicon dioxide.

15. The shutter as defined in claim 13 wherein said first and second thin films are alloys made from the system consisting of the elements Te-As-Ge-Si.

16. The shutter as defined in claim 13 wherein the thin films are $Te_{40}As_{35}Ge_7Si_{18}$.

17. The shutter as defined in claim 13 wherein the thickness of the thin films is at least 1 micron.

18. The shutter as defined in claim 17 wherein the spacing of the first and second electrodes respectively defines an aperture having a width of about 1 to 100 microns.

19. The shutter as defined in claim 13 wherein said means for detecting EMP is an antenna.

20. The shutter as defined in claim 19 wherein said means for applying the switching voltage includes a trigger circuit having an input to receive a signal from said antenna in response to the EMP detected and further including circuit means for discharging a capacitor charged to a voltage level at least equal to the threshold switching voltage of said thin films across each of the thin films.

21. A shutter device for protecting equipment from electromagnetic energy of a predetermined frequency while being transparent to all other electromagnetic wave frequencies, comprising:
   a substrate of material which is transparent to substantially all electromagnetic wave frequencies;
   first and second layers of an amorphous semiconductor chalogenide alloy glass on said substrate and being positioned on said substrate so that electromagnetic energy passes through said layers;
   activating means for creating a current in said layers with current flow in said first layer being opposite to current flow in said second layer and activating said layers when the electromagnetic energy of the predetermined frequency is incident on said activating means whereby said layers are transparent to all electromagnetic energy in the absence of electromagnetic energy of the predetermined frequency and are opaque to electromagnetic energy whenever electromagnetic energy of the predetermined frequency is present.

22. The shutter device defined in claim 21 wherein said layer activating means actuates said layers with a predetermined delay after said layer activating means detects the presence of electromagnetic energy of the predetermined frequency.

23. The shutter device defined in claim 22 wherein said predetermined delay is $10^{-6}$ sec or less.

24. The shutter device defined in claim 21 wherein said layer activating means includes an antenna located in close proximity to a line of sight through said layers and which is tuned to detect and to generate a signal in response to the presence of electromagnetic pulse energy.

25. The device defined in claim 24 wherein said layer activating means further includes a trigger circuit coupled to said antenna, said trigger circuit becoming operative only where electromagnetic pulse energy having an amplitude greater than a predetermined amount is detected and being inactive at all other times.

* * * * *